United States Patent [19]

Hiraiwa

[11] Patent Number: 4,774,856
[45] Date of Patent: Oct. 4, 1988

[54] PLANETARY GEAR TRAIN
[75] Inventor: Kazuyoshi Hiraiwa, Atsugi, Japan
[73] Assignee: Nissan Motor Co., Ltd., Yokohama, Japan
[21] Appl. No.: 102,300
[22] Filed: Sep. 25, 1987

Related U.S. Application Data

[63] Continuation of Ser. No. 707,799, Mar. 4, 1985, abandoned.

[30] Foreign Application Priority Data

Mar. 5, 1984 [JP] Japan .................. 59-41850
Mar. 5, 1984 [JP] Japan .................. 59-41851
Mar. 30, 1984 [JP] Japan .................. 59-60990

[51] Int. Cl.$^4$ ........................... F16H 57/10
[52] U.S. Cl. ................................. 74/763
[58] Field of Search ........... 74/674, 682, 705, 753, 74/762, 763

[56] References Cited

U.S. PATENT DOCUMENTS

| | | | |
|---|---|---|---|
| 3,053,117 | 9/1962 | Hensel | 74/763 |
| 3,483,771 | 12/1969 | Forster et al. | 74/763 X |
| 3,701,293 | 10/1972 | Mori et al. | 74/763 X |
| 3,812,739 | 5/1974 | Mori et al. | 74/763 |
| 4,157,046 | 6/1979 | O'Malley | 74/753 X |
| 4,237,749 | 12/1980 | Koivunen | 74/763 |
| 4,395,925 | 8/1983 | Gaus | 74/763 |

FOREIGN PATENT DOCUMENTS

| | | |
|---|---|---|
| 0080082 | 6/1983 | European Pat. Off. . |
| 0121259 | 10/1984 | European Pat. Off. . |
| 1207176 | 2/1960 | France .................. 74/674 |
| 1560504 | 3/1969 | France . |
| 2141354 | 5/1972 | Fed. Rep. of Germany . |
| 47-19268 | 9/1972 | Japan . |
| 47-23756 | 10/1972 | Japan . |
| 47-23764 | 10/1972 | Japan . |
| 58-84248 | 5/1983 | Japan . |
| 1536080 | 12/1978 | United Kingdom . |

OTHER PUBLICATIONS

Herbert E. Ellinger, "Auto-mechanics", Second Edition, Chapter 23, Automatic Transmission Fundamentals, p. 352.

Primary Examiner—Leslie A. Braun
Assistant Examiner—Dwight G. Diehl
Attorney, Agent, or Firm—Foley & Lardner, Schwartz, Jeffery, Schwaab, Mack, Blumenthal & Evans

[57] ABSTRACT

A planetary gear train comprises a first planetary gear set and a second planetary gear set. These two planetary gear sets coact with a change speed mechanism means, in the form of a pair of intermeshed gears, to provide at least four forward speeds including an overdrive.

43 Claims, 11 Drawing Sheets

| | C 36 | C 34 | C 56 | C 58 | B 44 | B 46 | RATIO | $\alpha_1 = 0.5$<br>$\alpha_2 = 0.3$<br>$i_1 = 0.75$<br>$i_2 = 1.05$ |
|---|---|---|---|---|---|---|---|---|
| 1 | | ○ | ○ | | | ○ | $(1+\alpha_1) i_2 + \dfrac{\alpha_1}{\alpha_2} i_1$ | 2.825 |
| 2 | | ○ | ○ | | ○ | | $(1+\alpha_1) i_2$ | 1.575 |
| 3 | ○ | ○ | ○ | | | | $i_2$ | 1.050 |
| 4 | ○ | (○) | | ○ | | | $i_1$ | 0.750 |
| R | | | ○ | | | ○ | $-\dfrac{i_1}{\alpha_2}$ | −2.500 |

FIG. 7A

| | C 104 | C 108 | C 136 | C 116 | C 132 | B 120 | B 122 | O/C 106 | O/C 118 | O/C 134 | RATIO | α1 = 0.45, α2 = 0.3, i2 = 1.3, i1 = 0.95 |
|---|---|---|---|---|---|---|---|---|---|---|---|---|
| AUTOMATIC DRIVE 1 | ○ | | | | | | | ○ | ○ | ○ | $(1+\alpha_1)i_2 + \frac{\alpha_1}{\alpha_2}i_1$ | 3.310 |
| 2 | ○ | ○ | | | | | | ○ | ○ | | $(1+\alpha_1)i_2$ | 1.885 |
| 3 | ○ | ○ | | | | (○) | | ○ | | | $i_2$ | 1.300 |
| 4 | (○) | ○ | ○ | | | ○ | | | ○ | | $i_1$ | 0.950 |
| 5 | (○) | ○ | ○ | ○ | | | | | | | $\frac{i_1}{1+\alpha_2}$ | 0.731 |
| REVERSE | ○ | | | ○ | ○ | | | | | | $-\frac{i_1}{\alpha_2}$ | −3.167 |
| ENGINE BRAKE 1 | | ○ | | ○ | ○ | | ○ | | | | | |
| 2 | | | | ○ | ○ | ○ | ○ | | | | | |
| 3 | | ○ | | (○) | | ○ | | | | | | |
| 4 | | ○ | ○ | ○ | | | | | | | | |

FIG.10A

| | C 184 | C 188 | C 190 | C 216 | C 192 | B 194 | B 196 | O/C 186 | O/C 193 | O/B 198 | RATIO | $\alpha_1 = 0.5$ $\alpha_2 = 0.35$ $i = 1.4$ |
|---|---|---|---|---|---|---|---|---|---|---|---|---|
| AUTOMATIC DRIVE 1 | ○ | | | | | | | ○ | ○ | ○ | $(1+\alpha_1)i + \dfrac{\alpha_1}{\alpha_2}$ | 3.529 |
| AUTOMATIC DRIVE 2 | ○ | | | | | ○ | | ○ | ○ | | $(1+\alpha_1)i$ | 2.100 |
| AUTOMATIC DRIVE 3 | ○ | | | | | ◎ | | ○ | | | $i$ | 1.400 |
| AUTOMATIC DRIVE 4 | ◎ | | ○ | ○ | | | | | ○ | | $1$ | 1.000 |
| AUTOMATIC DRIVE 5 | ◎ | | ○ | ○ | | ○ | | | | | $\dfrac{1}{1+\alpha_2}$ | 0.741 |
| REVERSE | | | | | ○ | | ○ | | | | $-\dfrac{1}{\alpha_2}$ | −2.857 |
| ENGINE BRAKE 1 | | ○ | | | ○ | | ○ | | | | | |
| ENGINE BRAKE 2 | | ○ | | | ○ | ○ | | | | | | |
| ENGINE BRAKE 3 | | ○ | ○ | | ◎ | | | | | | | |
| ENGINE BRAKE 4 | | | ○ | ○ | ○ | | | | | | | |

| | | RATIO |
|---|---|---|
| AUTOMATIC DRIVE | 1 | $(1+\alpha_1)i_1 + \frac{\alpha_1}{\alpha_2}i_2$ |
| | 2 | $(1+\alpha_1)i_1$ |
| | 3 | $i_1$ |
| | 4 | $i_2$ |
| | 5 | $\frac{i_2}{1+\alpha_2}$ |
| REVERSE | | $-\frac{i_2}{\alpha_2}$ |

PLANETARY GEAR TRAIN

BACKGROUND OF THE INVENTION

This application is a continuation of application Ser. No. 707,799, filed Mar. 4, 1985, now abandoned.

The present invention relates to a planetary gear train, and more particularly to a planetary gear train for an automotive automatic transmission.

A Simpson planetary gear train is a well known gear train which uses two planetary gear sets. A typical Simpson planetary gear train comprises an input shaft, an output shaft, a first planetary gear set, a second planetary gear set, a first drive connection, including a clutch, of the input shaft with a ring gear of the first planetary gear set, a second drive connection, including a clutch, of the input shaft with a sun gear of the first planetary gear set, a third drive connection of the sun gear of the first planetary gear set with a sun gear of the second planetary gear set, a first brake for the sun gears, a second brake for a pinion carrier of the second planetary gear set, a fourth drive connection of a ring gear of the second planetary gear set with the output shaft, and a fifth drive connection of a pinion carrier of the first planetary gear set with the output shaft. This known planetary gear set provides three forward speeds and one reverse speed.

SUMMARY OF THE PRESENT INVENTION

An object of the present invention is to improve the Simpson planetary gear train such that at least four forward speeds are provided without any addition of a third planetary gear set.

More particularly, an object of the present invention is to provide a planetary gear train which is simple in construction and short in axial dimension for installation in a limited space in an automotive vehicle.

A more specific object of the present invention is to provide a planetary gear train which is suitable for use in a transaxle combining a transmission with an engine.

According to the present invention, there is provided a planetary gear train comprising:

an input member;

an output member;

a first planetary gear set including a first sun gear, a first ring gear and a first pinion carrier which cooperate with each other to form said first planetary gear set;

a second planetary gear set including a second sun gear, a second ring gear and a second pinion carrier which cooperate with each other to form said second planetary gear set;

first drive means for connecting said input member with said first ring gear;

second drive means for connecting said input member with said first sun gear;

third drive means for connecting said first sun gear with said second sun gear;

first brake means for braking said second sun gear;

second brake means for braking said second pinion carrier;

fourth drive means for connecting said second ring gear with said output member; and fifth drive means for connecting said first pinion carrier with said output member, wherein said fifth drive means provides a first drive ratio between said first pinion carrier and said output member which first drive ratio is different from a second drive ratio provided by said fourth means between said second ring gear and said output member.

BRIEF DESCRIPTION OF THE DRAWINGS

FIGS. 1 to 12 are schematic diagrams showing preferred embodiments according to the present invention; and FIGS. 1A, 7A, 10A are 11A are tables showing the sequence of engagement of clutches and brakes.

DESCRIPTION OF THE PREFERRED EMBODIMENT

The present invention will now be described with reference to preferred embodiments thereof, and with reference to the accompanying drawings.

Figure 5:
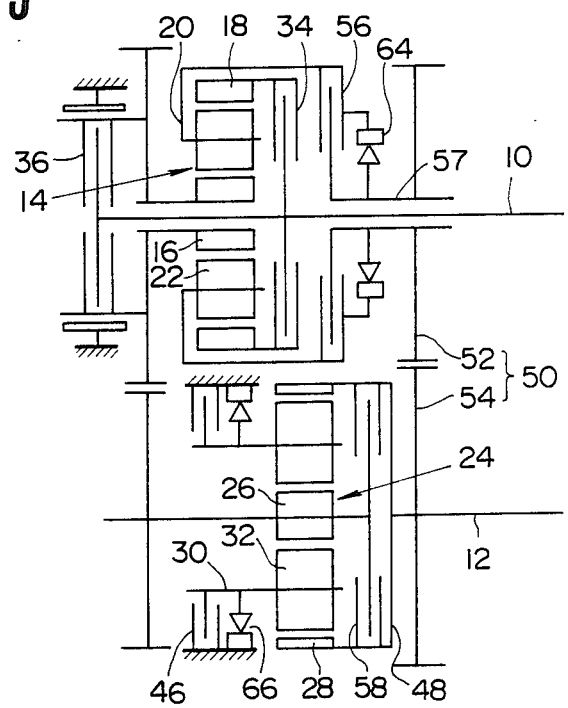
Figure 6:
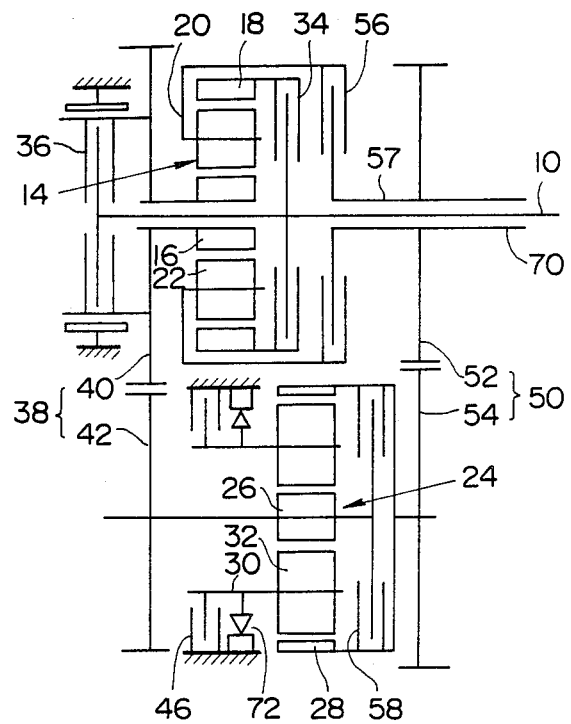
Figure 7:
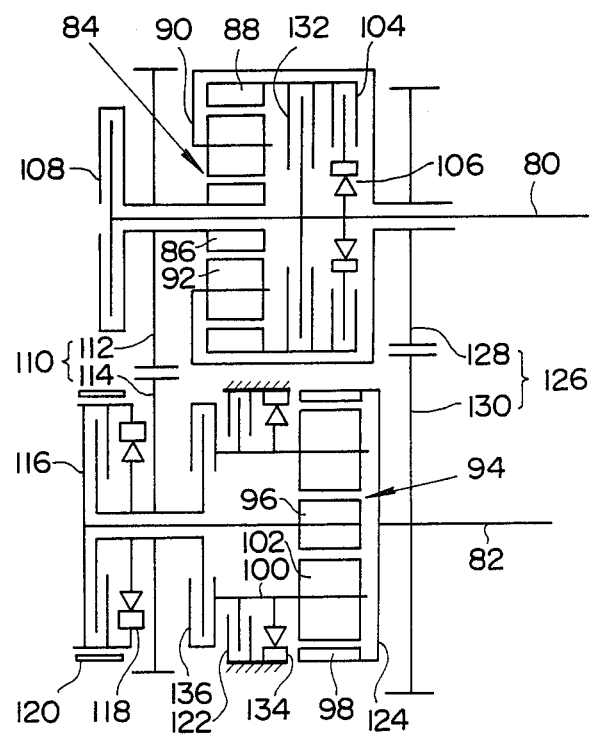
Figure 8:
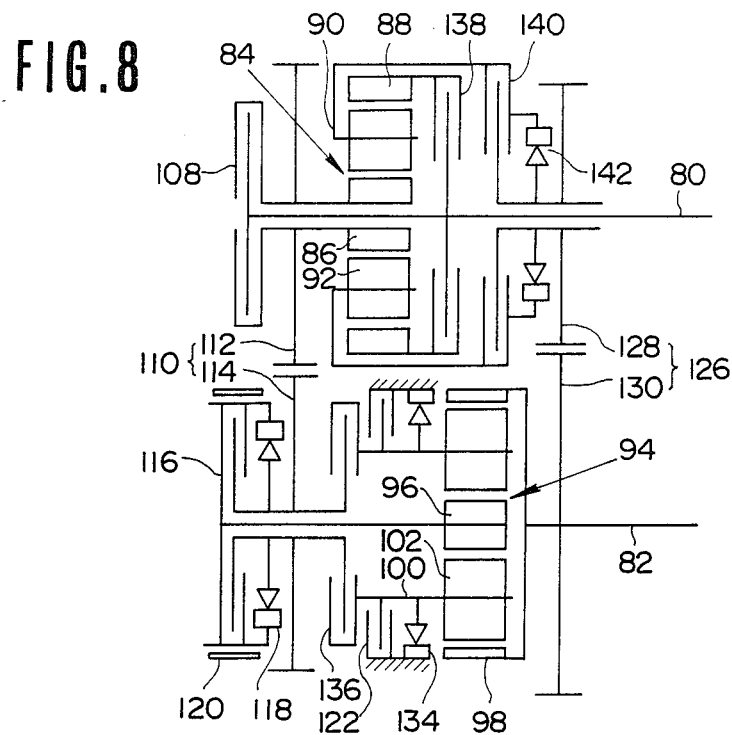
Figure 9:
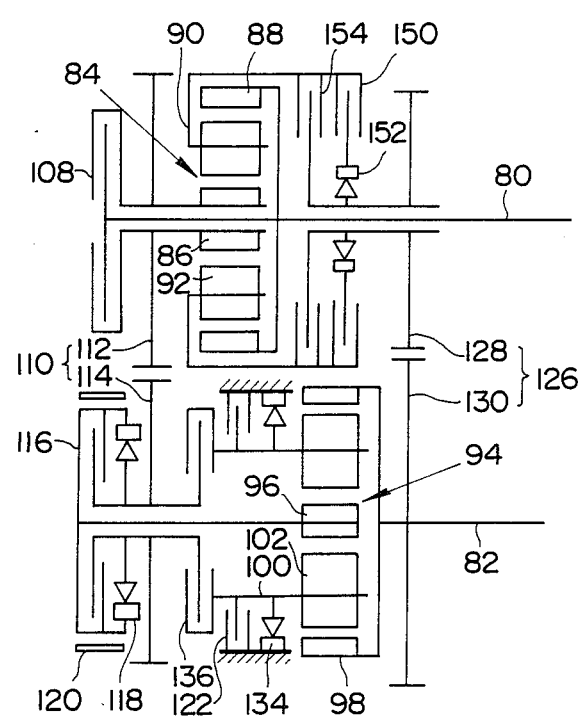
Figure 10:
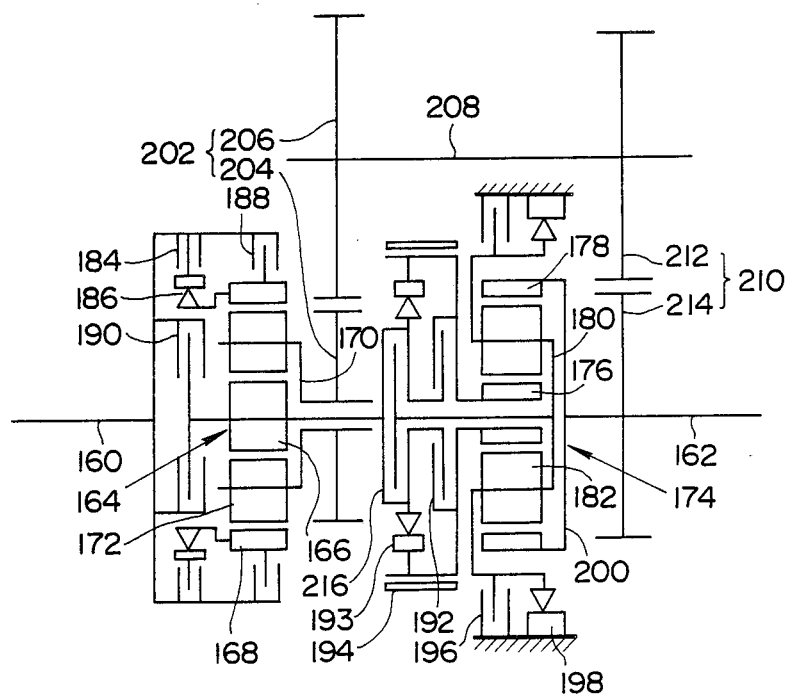
Figures 11, 11A:
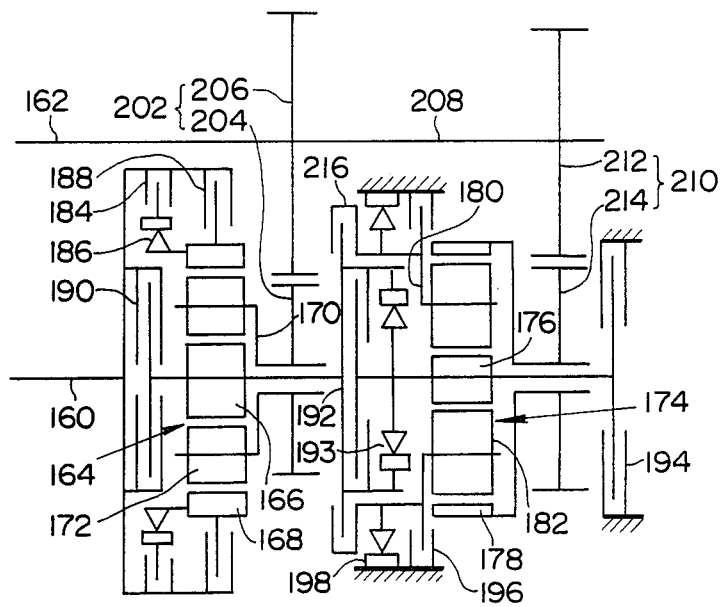
Figure 12:
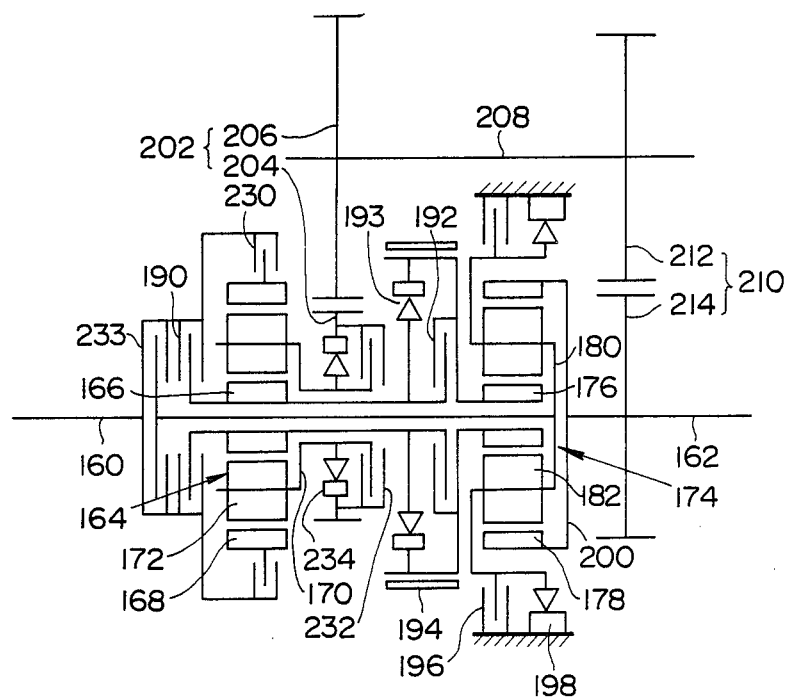

Referring to the accompanying drawings, FIGS. 1 to 6 show embodiments which may fall into a first group, FIGS. 7 to 9 show embodiments which may fall into a second group, and FIGS. 10 to 12 show embodiments which may fall into a third group.

Figures 1, 1A:
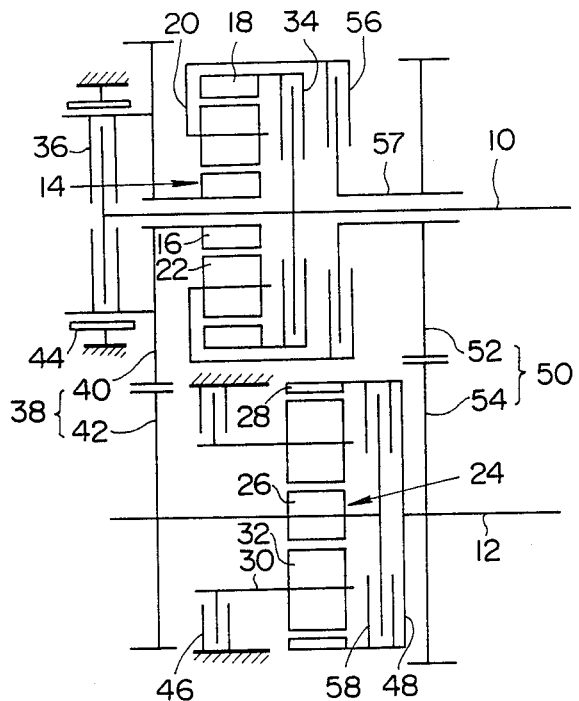

Referring to FIG. 1, there is shown a first embodiment of a planetary gear train which provides four forward speeds including an overdrive and one reverse drive as shown in FIG. 1A. The planetary gear train comprises an input shaft 10 which may be driven by a turbine of a torque converter (not shown) driven by an internal combustion engine (not shown), and an output shaft 12 which may be drivingly connected to automotive road wheels (not shown) via a suitable gearing (not shown). The input shaft 10 and output shaft 12 extend, in the same direction, along and are rotatable about a first axis and a second axis, respectively, and arranged in parallel. Similarly to a well known typical Simpson planetary gear train, it comprises a first planetary gear set 14 which includes a first sun gear 16, a first ring gear 18, and a first pinion carrier 20 rotatably supporting a plurality of pinions 22 meshing with the first sun and ring gears 16 and 18, and a second planetary gear set 24 which includes a second sun gear 26, a second ring gear 28, and a second pinion carrier 30 rotatably supporting a plurality of second pinions 32 meshing with the second sun and ring gears 26 and 28. The first planetary gear set 14 has a ratio $\alpha_1$, in number of teeth, between the first sun gear 16 and the first ring gear 18, viz., the ratio $\alpha_1$ being expressed by (the number of teeth of the first sun gear 16) divided by (the number of teeth of the first ring gear 18). The first and second planetary gear sets 14 and 24 are arranged to be rotatable about the first and second axes, respectively, and they are axially displaced as shown in FIG. 1. The second planetary gear set 24 has a ratio $\alpha_2$, viz., the ratio $\alpha_2$ being expressed by (the number of teeth of the second sun gear 26) divided by (the number of teeth of the second ring gear 28).

A first friction clutch 34 is provided which selectively connects the input shaft 10 with the first ring gear 18, and serves as a first drive means. A second friction clutch 36 is provided which selectively connects the input shaft 10 with the first sun gear 16, and serves as a second drive means. A first change speed mechanism 38 connects the first sun gear 16 with the second sun gear 26, and serves as a third drive means. The first change speed mechanism 38 includes a pair of gears 40 and 42 meshing with each other although it may take another power transmission form such as a chain drive mechanism or a belt and pulley drive mechanism. The gear 40 is connected with the first sun gear 16 for unitary rotation therewith and the gear 42 is connected with the second sun gear 26 for unitary rotation therewith. The first change speed mechanism 38 has a ratio $i_1$, in number of teeth, between the gears 42 and 40, the ratio $i_1$ being expressed by (the number of teeth of the gear 42) divided by (the number of teeth of the gear 40). A first brake 44 is provided which brakes the second sun gear 26 and the first sun gear 16, and a second brake 46 is provided which brakes the second pinion carrier 30. For connecting the second ring gear 28 with the output shaft 12, a radial extension 48 is provided, which serves as a fourth drive means. For connecting the first pinion carrier 20 with the output shaft 12, a second change speed mechanism 50 including a pair of gears 52 and 54, and a third friction clutch 56 are provided, serving as a fifth drive means. The second change speed mechanism 50 is in the form of pair of intermeshing gears 52 and 54 although it may take another form such as a chain drive mechanism or a belt and pulley drive mechanism. The gear 52 is connected with a hollow shaft 57 integral with a driven element of the third friction clutch 56, and the gear 54 is connected with the output shaft 12 for unitary rotation therewith. The third friction clutch 56 is drivingly connected in series with the second change speed mechanism 50 and selectively connects the first pinion carrier 20 with the output shaft 12. The second change speed mechanism 50 has a ratio $i_2$, in number of teeth, between the gears 54 and 52, viz., the ratio $i_2$ being expressed by (the number of teeth of the gear 54) divided by (the number of teeth of the gear 52). A fourth clutch 58 is provided which selectively connects the second sun gear 26 with the second ring gear 28 to lock the second planetary gear set 24.

As shown in FIG. 1A, the four clutches 34, 36, 56, 58 and two brakes 44, 46 are selectively engaged to provide four forward speeds and one reverse speed. In FIG. 1A, the sign o designates a clutch or a brake to be engaged or applied and the sign (o) designates a clutch or brake which is engaged but does not play any role in torque transmission. The gear ratio for each of the speeds is calculated on the assumption that $\alpha_1 = 0.5$, $\alpha_2 = 0.3$, $i_1 = 0.75$ and $i_2 = 1.05$.

As will be readily understood from FIGS. 1 and 1A, the planetary gear train provides power flow paths which are similar to the Simpson gear train does. In the third speed, the first planetary gear set 14 is locked to rotate with the input shaft 10 because the clutches 36 and 34 are engaged. This rotation of the first planetary gear set 14 is transmitted to the output shaft 12 via the clutch 56 and second change speed mechanism 50, thus providing a ratio that is equal to the ratio $i_2$ of the second change speed mechanism 50. In the fourth speed (overdrive), the input from the input shaft 10 is delivered via the clutch 36, the first sun gear 16, the first change speed mechanism 38 to the second planetary gear set 24. Since the second planetary gear set 24 is locked by the engagement of the clutch 48, the rotation of the second gun gear 26 causes the same rotation of the output shaft 12. Thus, the fourth speed provides a ratio that is equal to the ratio $i_1$ of the first change speed mechanism 38.

From the above description, it will be appreciated that the ratios $i_1$ and $i_2$ of the first and second change speed mechanisms 38 and 50 determine gear ratios for the third and fourth speeds, respectively. The ratio $i_2$ is different from the ratio $i_1$ and the former is larger than the latter. Thus, an appropriate gear ratio for each of the four speeds is easily obtained only by adding two change speed mechanism 38 and 50 which are easy and inexpensive to manufacture as compared to manufacturing difficulty and cost of planetary gear sets.

The four-speed planetary gear train just described is short in axial dimension because two planetary gear sets 14 and 24 are arranged in parallel, and are thus suitable for installation in F—F type automotive vehicle.

Figure 2:
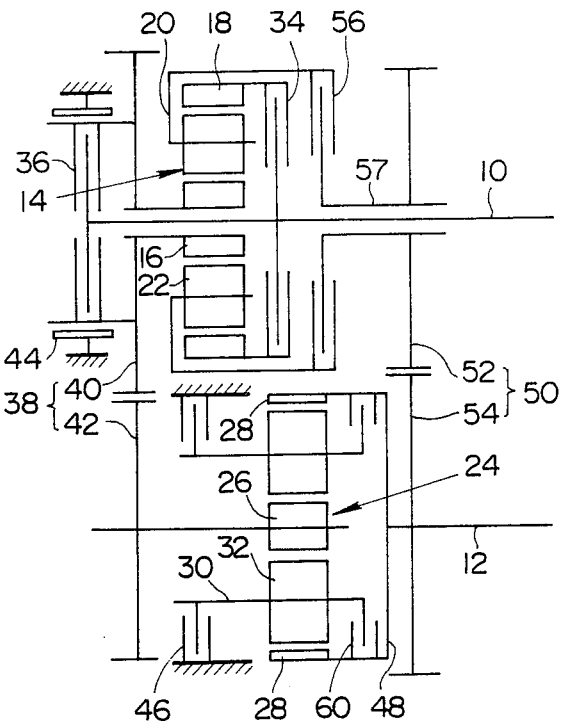

Referring to FIG. 2, a second embodiment is described which is substantially similar to the first embodiment except the provision of a friction clutch 60 instead of the friction clutch 58. The friction clutch 60 is engaged in the fourth speed similarly to the clutch 58 (see FIG. 1A) and thus selectively connects a second pinion carrier 30 with a second ring gear 28. The friction clutch 60 is arranged between a second planetary gear set 24 and a radial extension 48.

Figure 3:
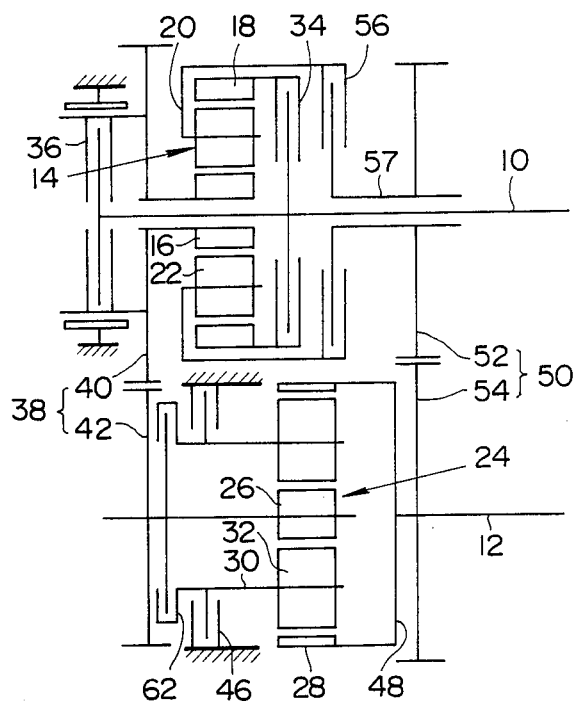

Referring to FIG. 3, a third embodiment is described. This embodiment is substantially similar to the first embodiment, but different from the latter in that instead of the friction clutch 58, a friction clutch 62 is provided between a brake 46 and a gear 42 of a first change speed mechanism 38. The friction clutch 62 is engaged in the fourth speed similarly to the friction clutch 58 (see FIG. 1A) and thus selectively connects a second sun gear 26 with a second pinion carrier 30.

Figure 4:
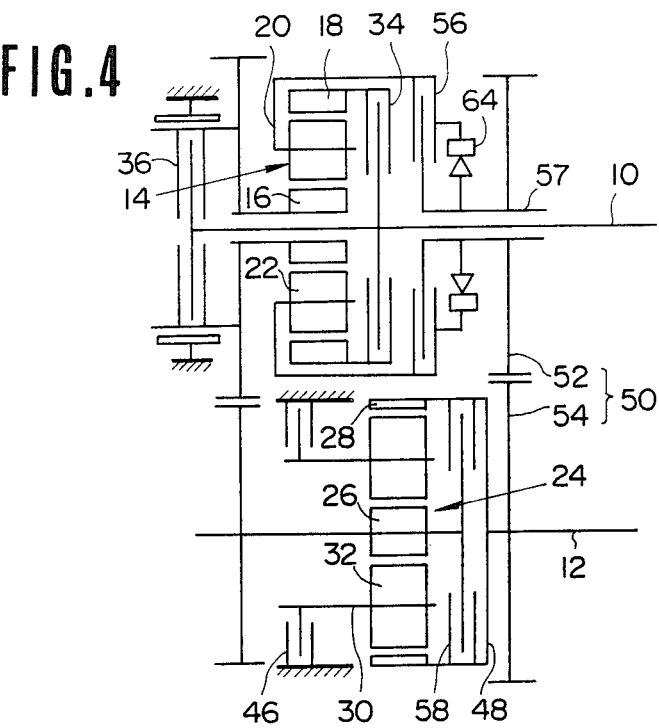

Referring to FIG. 4, a fourth embodiment is described. This embodiment is different from the first embodiment by the addition of a one-way clutch 64. The one-way clutch 64 is drivingly connected in parallel with a friction clutch 56 and coacts with a second change speed mechanism 50 to connect a first pinion carrier 20 with an output shaft 12 for a one-way drive.

Referring to FIG. 5, a fifth embodiment is described. This embodiment is substantially similar to the embodiment shown in FIG. 4 except the provision of a one-way brake 66 in parallel to a brake 46.

Referring to FIG. 6, a sixth embodiment is described. In this embodiment, a hollow shaft 57 integral with a gear 52 of a first change speed mechanism 50 is used as an output shaft 70. The other construction and arrangement are substantially similar to those of the first embodiment except the provision of a one-way brake 72 in parallel to a brake 46 for preventing a second pinion carrier 30 from rotating in a predetermined direction. When the output is taken out from the gear 52 of the first change speed mechanism 50, the output shaft 70 rotates in an opposite direction to the rotation of the output shaft 12. Assuming that $\alpha_1$, $\alpha_2$, and $i_1$ and $i_1$ are given the same values as in the first embodiment, the gear ratios result in values as follows:

1st speed = 2.690
2nd speed = 1.500
3rd speed = 1.000
4th speed = 0.714
Rev. speed = 2.381.

Referring to FIGS. 7 to 9, embodiments falling into the second group are hereinafter described.

Referring to FIGS. 7 and 7A, there is shown a seventh embodiment of a planetary gear train. This planetary gear train provides five forward speeds and one reverse as shown in FIG. 7A. Similarly to the first embodiment, the planetary gear train comprises an input shaft 80 and an output shaft 82 which extend, in the same direction, along and are rotatable about a first axis and a second axis, respectively, and are arranged in parallel. It also comprises a first planetary gear set 84 which includes a first sun gear 86, a first ring gear 88, and a first pinion carrier 90 with a plurality of pinions 92, and a second planetary gear set 94 which includes a second sun gear 96, a second ring gear 98, and a second pinion carrier 100 with a plurality of second pinions 102. The first and second planetary gear sets 84 and 94 have ratios $\alpha_1$ and $\alpha_2$, respectively.

A first friction clutch 104 is provided which selectively connects the input shaft 80 with the first ring gear 88. A one-way clutch 106 is drivingly connected in series with the first friction clutch 104 and coacts with the first friction unit 104 to connect the input shaft 80 with the first ring gear 88 for a one-way drive, thus serving as a first drive means in cooperation with the first friction clutch 104. A second friction clutch 108 is provided which selectively connects the input shaft 80 with the first sun gear 86, and thus serves as a second drive means. A first change speed mechanism 110 is provided which includes a pair of intermeshed gears 112 and 114, the gear 112 being connected with the first sun gear 86 for unitary rotation therewith. A friction clutch 116 is provided which coacts with the first change speed mechanism 110 to selectively connects the first sun gear 86 with the second sun gear 96. A one-way clutch 118 is drivingly connected in parallel to the friction clutch 116 and coacts with the first change speed mechanism 110 to connect the first sun gear 86 with the second sun gear 96 for a one-way drive. Thus, the first change speed mechanism 110, friction clutch 116 and one-way clutch 118 serve as a third drive means. The first change speed mechanism 110 has a ratio $i_1$, in number of teeth, between the gears 114 and 112. A first brake 120 is provided which brakes the second sun gear 96 and the first sun gear 86 via the first change speed mechanism 110. A second brake 122 is provided which brakes the second pinion carrier 100. For connecting the second ring gear 98 with the output shaft 82, a radial extension 124 is provided and serves as a fourth drive means. A second change speed mechanism 126 including a pair of gears 128 and 130 is provided which connects the first pinion carrier 90 with the output shaft 82, and thus serves as a fifth drive means. The second change speed mechanism 126 has a ratio $i_2$, in number of teeth, between the gears 130 and 128. The gear 128 is connected with the first pinion carrier 90 for unitary rotation therewith, and the other gear 130 is connected with the output shaft 82 for unitary rotation therewith. A friction clutch 132 is drivingly connected in parallel to the friction clutch 104 and the one-way clutch 106 and selectively connects the input shaft 80 with the first ring gear 88. A one-way brake 134 is provided to prevent the second pinion carrier 100 from rotating in a predetermined direction and arranged in parallel to the second brake 122. A friction clutch 136 is provided which coacts with the first change speed mechanism 110 and selectively connects the first sun gear 86 with the second pinion carrier 100.

The clutches and brakes are selectively engaged as shown in FIG. 7A to provide five forward speeds in automatic drive range, four speeds for engine braking and one reverse. It is assumed in FIG. 7A that $\alpha_1=0.45$, $\alpha_2=0.3$, $i_1=0.95$ and $i_2=1.3$.

Referring to FIG. 8, an eighth embodiment is described. This embodiment is substantially similar to the embodiment shown in FIG. 7, but is different from the latter in that there is provided only one friction clutch 138 between an input shaft 80 and a first ring gear 88, and there are provided a friction clutch 140 and a one-way clutch 142 between a first pinion carrier 90 and a gear 128 of a second change speed mechanism 126. The friction clutch 138 is engaged in a similar manner to the friction clutch 104 and thus selectively connects the input shaft 80 with the first ring gear 88. The one-way clutch 142 is drivingly connected in parallel to the friction clutch 140 and coacts with the second change speed mechanism 126 to connect the first pinion carrier 90 with an output shaft 82. The one-way clutch 142 is rendered into operation in a similar manner to the one-way clutch 106 as shown in FIG. 7A. The friction clutch 140 is engaged in a similar manner to the friction clutch 132 as shown in FIG. 7A.

Referring to FIG. 9, a ninth embodiment is described. This embodiment is substantially similar to the embodiment shown in FIG. 7, but is different from the latter in that an input shaft 80 is directly connected with a first ring gear 88, and there are provided a friction clutch 150 in series with a one-way clutch 152 and another friction clutch 154 between a first pinion carrier 90 and a gear 128 of a second change speed mechanism 126. The friction clutch 150 is engaged in a similar manner to the friction clutch 104 as shown in FIG. 7A, and the one-way clutch 152 coacts with the friction clutch 150 and the change speed mechanism 126 to connect the first pinion carrier 90 with an output shaft 82 for a one-way drive. This one-way clutch 152 is rendered operative in a similar manner to the one-way clutch 106 as shown in FIG. 7A. The friction clutch 154 is drivingly connected in parallel to the series connected clutch 150 and one-way clutch 152 and selectively engaged in a similar manner to the friction clutch 132 (see FIG. 7A) to connect the first pinion carrier 90 with the second change speed mechanism 126 and then with the output shaft 82.

Referring to FIGS. 10 to 12, embodiments falling into the third group are herinafter described.

In each of the previously described embodiments, the first and second planetary gear sets are arranged about two parallel axes and the first sun gear (16 or 86) is connected via the first change speed mechanism (38 or 110), the embodiments which will be described hereinafter do not employs the parallel arrangement of the first and second planetary gear sets. As a result, it does not use a change speed mechanism for interconnecting first and second sun gears.

Referring to FIGS. 10 and 10A, there is shown a tenth embodiment of a planetary gear train. This planetary gear train provides five forward speeds and one reverse speed as shown in FIG. 10A. Similarly to the first embodiment, the planetary gear train comprises an input shaft 160 and an output shaft 162, both extending along and rotatable about a common or first axis. It also comprises a first planetary gear set 164 which includes a first sun gear 166, a first ring gear 168, and a first pinion carrier 170 with a plurality of first pinions 172, and a second planetary gear set 174 which includes a second sun gear 176, a second ring gear 178, and a second pinion carrier 180 with a plurality of second pinions 182. The first and second planetary gear sets 164 and 174 are arranged about the common axis shared by the input and output shafts 160 and 162 and have ratios $\alpha_1$ and $\alpha_2$, respectively.

A first friction clutch 184 is provided which selectively connects the input shaft 160 with the first ring gear 168. A one-way clutch 186 is drivingly connected in series with the first friction clutch 184 and coacts with the first friction clutch 184 to connect the input shaft 160 with the first ring gear 88 for a one-way drive, serving as a first drive means. A friction clutch 188 is drivingly connected in parallel to the friction clutch 184 and one-way clutch 186 and selectively connects the input shaft 160 with the first ring gear 168. A friction clutch 190 is provided which selectively connects the input shaft 160 with the input shaft 160 with the first sun gear 166, serving as a second drive means. For connecting the first sun gear 166 with the second sun gear 176, a friction clutch 192 is provided in parallel to a one-way clutch 193. The one-way clutch 193 connects the first sun gear 166 with the second sun gear 176 for a one-way drive, and the friction clutch 192 selectively connects the first sun gear 166 with the second sun gear 176 bypassing the one-way clutch 193. A first brake 194 is provided which brakes the second sun gear 176. A second brake 196 is provided which brakes the second pinion carrier 180. A one-way brake 198 is arranged in parallel to the second brake 196 and prevents the second pinion carrier 180 from rotating in a predetermined direction. For connecting the second ring gear 178 with the output shaft 162, a radial extension 200 is connected between the second ring gear 178 and the output shaft 162. For connecting the first pinion carrier 180 with the output shaft 162, there are provided a first change speed mechanism 202 with gears 204 and 206, a counter or auxiliary shaft 208 rotatable about a second axis parallel to the first axis, and a second change speed mechanism 210 with gears 212 and 214. The gear 204 is connected with the first pinion carrier 170 for unitary rotation therewith, and the gear 206 is connected with the shaft 208 for unitary rotation therewith. The gear 212 is connected with the shaft 208 for unitary rotation therewith and the gear 214 is connected with the output shaft 162 for unitary rotation therewith. The overall gearing including the first and second change speed mechanisms 202 and 210 provides a ratio i which is expressed as, i=(the number of teeth of the gear 206)×(the number of teeth of the gear 214)/(the number of teeth of the gear 204)×(the number of teeth of the gear 212).

A friction clutch 216 is provided which selectively connects the sun gear 166 with the second pinion carrier 180.

The clutches and brakes are selectively engaged as shown in FIG. 10A to provide five forward speeds in automatic drive range, four speeds for engine braking and one reverse. It is assumed in FIG. 10A that $\alpha_1 = 0.5$, $\alpha_2 = 0.35$ and i=1.4.

Referring to FIG. 11, an eleventh embodiment is described. This embodiment is different from the embodiment shown in FIG. 10 in that an auxiliary shaft 208 extends in the same direction as an input shaft extends 160 and used as an output shaft 162, and the arrangement and construction of a brake 194 and a clutch 216 have been altered. In this embodiment, a second ring gear 178 is connected with the output shaft 162 via a second change speed mechanism 210, while a first pinion carrier 170 is connected with the output shaft 162 via a first change speed mechanism 202. Assuming that first and second planetary gear sets 164 and 174 have ratios $\alpha_1$ and $\alpha_2$, respectively, and the first and second change speed mechanism 202 and 210 have ratios $i_1$ and $i_2$, respectively, a gear ratio for each speed can be expressed as shown in FIG. 11A.

Referring to FIG. 12, the last embodiment is described. This embodiment is substantially similar to the embodiment shown in FIG. 10. However, this embodiment is different from the latter in that there is only one friction clutch 230 for connecting an input member 160 with a first ring gear 168, and there are provided a friction clutch 232 and a one-way clutch 234 between a first pinion carrier 170 and a gear 204 of a change speed mechanism 202. Another difference is that a friction clutch 233 which is similar to the friction clutch 216 is drivingly connected in parallel with a friction clutch 190. In FIG. 10, the friction clutch 216 is connected in series with the friction clutch 190. As shown in FIG. 12, the friction clutch 230 selectively connects an input shaft 160 with the first ring gear 168 and is engaged in the same as the clutch 184 as shown in FIG. 10A. The one-way clutch 234 is drivingly connected in parallel with the friction clutch 232 and coacts with the first change speed mechanism 202 to connect the first pinion carrier 170 with an output shaft 162 via an auxiliary shaft 208 and a second change speed mechanism 210. The one-way clutch 234 and the friction clutch 232 are similar to the one-way clutch 186 and the friction clutch 188 in operating sequence (see FIG. 10A).

It will now be understood from the description of the embodiments that, according to the present invention, the number of speeds has been increased in a planetary gear train having two planetary gear sets without any addition of a third planetary gear set.

What is claimed is:
1. A planetary gear train comprising:
an input member;
an output member;
a first planetary gear set including a first sun gear, a first ring gear and a first pinion carrier rotatably supporting first planet pinions;
a second planetary gear set including a second sun gear, a second ring gear and a second pinion carrier rotatably supporting second planet pinions;
first drive means for connecting said input member with said first ring gear;
second drive means for connecting said input member with said first sun gear;
third drive means for constantly connecting said first sun gear with said second sun gear and establishing a force transmitting positive drive from said first sun gear to said second sun gear, whereby said first sun gear rotates at a speed different from said second sun gear;
first brake means for braking said second sun gear;
second brake means for braking said second pinion carrier;
fourth drive means for connecting said second ring gear with said output member and providing a first speed ratio therebetween; and
fifth drive means for connecting said first pinion carrier with said output member and providing a second speed ratio therebetween, said second speed ratio being different from said first speed ratio.

2. A planetary gear train as claimed in claim 1, wherein said fifth drive means includes a change speed mechanism between said first pinion carrier and said output member, said change speed mechanism providing a speed reduction.

3. A planetary gear train as claimed in claim 2, wherein said first sun gear is selectively connected with said second pinion carrier.

4. A planetary gear train as claimed in claim 1, wherein said first sun gear is selectively connected with said second pinion carrier.

5. A planetary gear train as claimed in claim 1, wherein said input member and output member extend along and are rotatable about different first and second axes, respectively, which are parallel to each other, and said first planetary gear set and second planetary gear set are arranged about said first and second axes, respectively.

6. A planetary gear train as claimed in claim 1, wherein
said third drive means includes a first change speed mechanism which connects said first sun gear with said second sun gear, and said fifth drive means includes a second change speed mechanism which connects said first pinion carrier with said output member.

7. A planetary gear train as claimed in claim 6, wherein
said first drive means includes a first friction clutch means for selectively connecting said input member with said first ring gear,
said second drive means includes a second friction clutch means for selectively connecting said input member with said first sun gear, and
said fifth drive means includes a third friction clutch means coacting with said second change speed mechanism for selectively connecting said first pinion carrier with said output member.

8. A planetary gear train as claimed in claim 7, further comprising a fourth friction clutch means for selectively connecting said second sun gear with said second ring gear.

9. A planetary gear train as claimed in claim 7, wherein said fifth drive means includes a first one-way clutch means coacting with said second change speed mechanism for connecting said first pinion carrier with said output member for a one-way drive.

10. A planetary gear train as claimed in claim 9, wherein said second brake means includes a second one-way brake means for preventing said second pinion carrier from rotating in a predetermined direction.

11. A planetary gear train as claimed in claim 7, further comprising a fourth friction clutch means for selectively connecting said second pinion carrier with said second ring gear.

12. A planetary gear train as claimed in claim 11, wherein said fourth friction clutch means is arranged between said second planetary gear set and said output member.

13. A planetary gear train as claimed in claim 11, wherein said fourth friction clutch means is arranged between said first change speed mechanism and said second brake means.

14. A planetary gear train as claimed in claim 1, wherein
said third drive means includes a first change speed mechanism which connects said first sun gear with said second sun gear, and
said fourth drive means includes a second change speed mechanism which connects said second ring gear with said output member.

15. A planetary gear train as claimed in claim 14, wherein
said first drive means includes a first friction clutch means for selectively connecting said input member with said first ring gear,
said second drive means includes a second friction clutch means for selectively connecting said input member with said first sun gear, and
said fifth drive means includes a third friction clutch means for selectively connecting said first pinion carrier with said output member.

16. A planetary gear train as claimed in claim 1, wherein said fifth drive means includes a change speed mechanism which connects said first pinion carrier with said output member.

17. A planetary gear train as claimed in claim 16, wherein said fourth drive means includes a second change speed mechanism which connects said second ring gear with said output member.

18. A planetary gear train as claimed in claim 17, wherein
said first drive means includes a first friction clutch means for selectively connecting said input member with said first ring gear, and
said second drive means includes a second friction clutch means for selectively connecting said input member with said first sun gear.

19. A planetary gear train as claimed in claim 16, wherein
said first drive means includes a first friction clutch means for selectively connecting said input member with said first ring gear,
said second drive means includes a second friction clutch means for selectively connecting said input member with said first sun gear.

20. A planetary gear train as claimed in claim 19, further comprising a third friction clutch means for selectively connecting said first sun gear with said second pinion carrier.

21. A planetary gear train as claimed in claim 20, wherein said third friction clutch means is drivingly connected in series with said second friction clutch means.

22. A planetary gear train as claimed in claim 20, wherein said third friction clutch means is driving connected in parallel with said second friction clutch means.

23. A planetary gear train as claimed in claim 20, wherein said third drive means includes a fourth friction clutch means for selectively connecting said first sun gear with said second sun gear.

24. A planetary gear train as claimed in claim 23, wherein said fifth drive means includes a fifth friction clutch means coacting withs said change speed mechanism for selectively connecting said first pinion carrier with said output member.

25. A planetary gear train as claimed in claim 24, wherein said fifth drive means includes a first one-way clutch means drivingly connected in parallel with said fifth friction clutch means for connecting said first pinion carrier with said output member.

26. A planetary gear train as claimed in claim 25, wherein said third drive means includes a second one-way clutch means drivingly connected in parallel with said fourth friction clutch means for connecting said first sun gear with said second sun gear for a one-way drive.

27. A planetary gear train as claimed in claim 26, wherein said second brake means includes a one-way brake means for preventing said second pinion carrier from rotating in a predetermined direction.

28. A planetary gear train as claimed in claim 23, wherein said first drive means includes a first one-way clutch means drivingly connected in series with said first friction clutch means and coacting therewith for connecting said input member with said first ring gear for a one-way drive.

29. A planetary gear train as claimed in claim 28, wherein said first drive means includes a fifth friction clutch means drivingly connected in parallel with said first friction clutch means and said first one way clutch means.

30. A planetary gear train as claimed in claim 28, wherein said third drive means includes a second one-way clutch means drivingly connected in parallel with said fourth friction clutch means for connecting said first sun gear with said second sun gear for a one-way drive.

31. A planetary gear train as claimed in claim 30, wherein said second brake means includes a one-way brake means for preventing said second pinion carrier from rotating in a predetermined direction.

32. A planetary gear train comprising:
an input member;
an output member;
a first planetary gear set including a first sun gear, a first ring gear and a first pinion carrier rotatably supporting first planet pinions;
a second planetary gear set including a second sun gear, a second ring gear and a second pinion carrier rotatably supporting second planet pinions;
first drive means for connecting said input member with said first ring gear;
second drive means for connecting said input member with said first sun gear;
third drive means for connecting said first sun gear with said second sun gear;
first brake means for braking said second sun gear;
second brake means for braking said second pinion carrier;
fourth drive means for connecting said second ring gear with said output member and providing a first speed ratio therebetween; and
fifth drive means for connecting said first pinion carrier with said output member and providing a second speed ratio therebetween, said second speed ratio being different from said first speed ratio;
wherein said third drive means includes a first change speed mechanism which connects said first sun gear with said second sun gear and a one-way clutch means coacting with said first change speed mechanism for connecting said first sun gear with said second sun gear for a one-way drive, and
said fifth drive means includes a second change speed mechanism which connects said first pinion carrier with said output member.

33. A planetary gear train as claimed in claim 32, wherein
said first drive means includes a first friction clutch means for selectively connecting said input member with said first ring gear, and
said second drive means includes a second friction clutch means for selectively connecting said input member with said first sun gear.

34. A planetary gear train as claimed in claim 33, further comprising a third friction clutch means coacting with said first change speed mechanism for selectively connecting said first sun gear with said second pinion carrier.

35. A planetary gear train as claimed in claim 34, wherein said third drive means includes a fourth friction clutch means coacting with said first change speed mechanism for selectively connecting said first sun gear with said second sun gear.

36. A planetary gear train as claimed in claim 35, wherein
said first drive means includes a second one-way clutch means drivingly connected in series with said first friction clutch means for connecting said input member with said first ring gear for a one-way drive and a fifth friction clutch means drivingly connected in parallel to said first friction clutch means and said second one-way clutch means for selectively connecting said input member with said first ring gear.

37. A planetary gear train as claimed in claim 36, wherein said second brake means includes a one-way brake means for preventing said second pinion carrier from rotating in a predetermined direction.

38. A planetary gear train as claimed in claim 35, wherein said fifth drive means includes a second one-way clutch means coacting with said second change speed mechanism for connecting said first pinion carrier with said output member for a one-way drive.

39. A planetary gear train as claimed in claim 38, wherein said fifth drive means includes a fifth friction clutch means drivingly connected in parallel to said second one-way clutch means and coacting with said second change speed mechanism for selectively connecting said first pinion carrier with said output member.

40. A planetary gear train as claimed in claim 32, wherein
said fifth drive means includes a first friction clutch means coacting with said second change speed mechanism for selectively connecting said first pinion carrier with said output member, and
said second drive means includes a second friction clutch means for selectively connecting said input member with said first sun gear.

41. A planetary gear train as claimed in claim 40, further comprising a third friction clutch means coacting with said first change speed mechanism for selectively connecting said first sun gear with said second pinion carrier.

42. A planetary gear train as claimed in claim 41, wherein said third drive means includes a fourth friction clutch means coacting with said first change speed mechanism for selectively connecting said first sun gear with said second sun gear.

43. A planetary gear train as claimed in claim 42, wherein said fifth drive means include a second one-way clutch means drivingly connected in series with said first friction clutch means for connecting said first pinion carrier with said output member for a one-way drive, and a fifth, friction clutch means drivingly connected in parallel to said first friction clutch means and said second one-way clutch means and coacting with said second change speed mechanism for selectively connecting said first pinion carrier with said output member.

* * * * *